(12) United States Patent
Lam et al.

(10) Patent No.: US 10,111,115 B2
(45) Date of Patent: Oct. 23, 2018

(54) FRONT END SYSTEM WITH LOSSY TRANSMISSION LINE BETWEEN FRONT END MODULE AND TRANSCEIVER

(71) Applicant: SKYWORKS SOLUTIONS, INC., Woburn, MA (US)

(72) Inventors: Lui Lam, Lexington, MA (US); Jose Maria Elizalde Harrison, Newburyport, MA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 0 days.

(21) Appl. No.: 15/286,195

(22) Filed: Oct. 5, 2016

(65) Prior Publication Data

US 2017/0099608 A1 Apr. 6, 2017

Related U.S. Application Data

(60) Provisional application No. 62/237,909, filed on Oct. 6, 2015.

(51) Int. Cl.
*H04W 24/02* (2009.01)
*H04W 88/02* (2009.01)
*H04L 12/933* (2013.01)

(52) U.S. Cl.
CPC .......... *H04W 24/02* (2013.01); *H04L 49/109* (2013.01); *H04W 88/02* (2013.01)

(58) Field of Classification Search
CPC ......... H04B 1/48; H04B 1/3827; H04L 25/06; H04L 25/0264; H04W 88/06; H04W 88/14

USPC .................................................. 375/219–222
See application file for complete search history.

(56) References Cited

U.S. PATENT DOCUMENTS

| | | | | |
|---|---|---|---|---|
| 6,640,308 B1* | 10/2003 | Keyghobad | .......... | G05B 19/042 370/254 |
| 6,801,788 B1* | 10/2004 | Csapo | ................ | H04W 88/085 455/500 |
| 9,391,452 B1* | 7/2016 | Cousinard | ................ | H02J 1/00 |
| 2003/0134601 A1* | 7/2003 | Jou | .......................... | H04B 1/18 455/82 |
| 2004/0033787 A1* | 2/2004 | Weber | ...................... | H04B 7/04 455/78 |
| 2006/0063494 A1* | 3/2006 | Zhang | ...................... | H04B 1/18 455/78 |
| 2006/0139833 A1* | 6/2006 | Ranta | ..................... | H01Q 1/246 361/113 |
| 2008/0055172 A1* | 3/2008 | Chen | ..................... | H01Q 1/521 343/729 |

(Continued)

*Primary Examiner* — Emmanuel Bayard
(74) *Attorney, Agent, or Firm* — Chang & Hale LLP

(57) ABSTRACT

Disclosed herein are various examples of architectures, circuits, devices and methods that can be configured to, among other things, improve the efficiency and/or noise figure of signal amplification systems. To achieve this improvement, a front end module is disposed close to a corresponding antenna with a transmission line between the front end module and a transceiver. This results in a bulk of the loss between the antenna and the transceiver occurring between the front end module and the transceiver. A control and/or supply voltage can also be provided to the front end module through the transmission line, reducing or eliminating the need for separate signal and/or control paths to the front end module.

16 Claims, 8 Drawing Sheets

(56) References Cited

U.S. PATENT DOCUMENTS

| | | | |
|---|---|---|---|
| 2009/0247082 A1* | 10/2009 | Sathath | G06F 1/1616 455/41.2 |
| 2009/0304055 A1* | 12/2009 | Nino | H04W 24/02 375/222 |
| 2011/0165848 A1* | 7/2011 | Gorbachov | H04B 1/0064 455/78 |
| 2012/0307695 A1* | 12/2012 | Yehezkely | H01P 5/20 370/310 |
| 2012/0307943 A1* | 12/2012 | Umeda | H04B 3/54 375/324 |
| 2013/0271221 A1* | 10/2013 | Levesque | H03F 3/193 330/294 |
| 2014/0037077 A1* | 2/2014 | Marchetti | H04B 3/02 379/93.06 |
| 2014/0314131 A1* | 10/2014 | Lu | H04B 1/0458 375/219 |
| 2016/0020737 A1* | 1/2016 | Kong | H03F 3/19 455/73 |
| 2016/0308576 A1* | 10/2016 | Khlat | H04B 1/18 |
| 2016/0352374 A1* | 12/2016 | Wloczysiak | H04B 1/10 |
| 2017/0054215 A1* | 2/2017 | Munoz-Acevedo | H04B 17/19 |
| 2017/0054515 A1* | 2/2017 | Soto | H04B 10/808 |
| 2017/0063425 A1* | 3/2017 | Khlat | H04B 1/40 |

\* cited by examiner

FRONT END SYSTEM WITH LOSSY TRANSMISSION LINE BETWEEN FRONT END MODULE AND TRANSCEIVER

CROSS-REFERENCE TO RELATED APPLICATIONS

This application claims priority to U.S. Provisional Application No. 62/237,909 filed Oct. 6, 2015 and entitled "POWER AMPLIFICATION SYSTEM WITH LOSSY TRANSMISSION LINE BETWEEN POWER AMPLIFIER AND TRANSCEIVER," which is expressly incorporated herein by reference in its entirety for all purposes.

BACKGROUND

Field

The present disclosure relates to improving efficiency and/or noise figure in wireless devices having transceivers and front end systems configured to amplify signals for wireless communications.

Description of Related Art

Signal amplification systems can be used to amplify signals for wireless transmission and/or to amplify received wireless transmissions. Wireless devices that include such amplification systems experience signal degradation as signals propagate between components. Circuits and circuit design can be implemented that increases the efficiency of transmitting signals and/or that reduces the noise figure for received signals, thereby improving performance of the wireless device.

SUMMARY

According to a number of implementations, the present disclosure relates to a wireless communications system that includes a transceiver, a lossy transmission line communicatively coupled to the transceiver, a first terminal communicatively coupled to the transceiver through the lossy transmission line, a second terminal communicatively coupled to an antenna, and a front end module disposed between the first terminal and the second terminal, the front end module configured to amplify a signal received at the first terminal or the second terminal.

In some embodiments, signal loss between the transceiver and the front end module is greater than signal loss between the front end module and the second terminal. In some embodiments, the signal loss over the lossy transmission line between the transceiver and the front end module is greater than 1 dB and the signal loss between the front end module and the second terminal is less than 1 dB. In some embodiments, the signal loss over the lossy transmission line between the transceiver and the front end module is greater than or equal to 2 dB and less than or equal to 5 dB.

In some embodiments, the front end module further comprises a control terminal configured to receive a control signal, the control signal provided through the lossy transmission line that is communicatively coupled to the control terminal. In some embodiments, the system further includes a DC coupler configured to couple a DC voltage to the lossy transmission line and a DC extractor configured to extract a DC voltage from the lossy transmission line, the DC extractor coupled to the control terminal.

In some embodiments, the front end module further comprises a supply terminal configured to receive a supply voltage, the supply voltage provided through the lossy transmission line that is communicatively coupled to the supply terminal. In some embodiments, the system further includes a DC coupler configured to couple a DC voltage to the lossy transmission line and a DC extractor configured to extract a DC voltage from the lossy transmission line, the DC extractor coupled to the supply terminal. In some embodiments, the front end module is controlled by the supply signal. In some embodiments, the system further includes a controller configured to control a state of the front end module based on a voltage level of the supply signal. In some embodiments, the DC coupler includes an LC circuit having a capacitor disposed between the lossy transmission line and the transceiver and an inductor disposed between the lossy transmission line and a source of the supply voltage.

In some embodiments, the first terminal is configured to receive a transmission signal from the transceiver, the front end module is configured to amplify the transmission signal, and the second terminal is configured to transmit the amplified transmission signal to the antenna. In some embodiments, the second terminal is configured to receive a reception signal from the antenna, the front end module is configured to amplify the reception signal, and the first terminal is configured to transmit the amplified reception signal to the transceiver.

In some embodiments, the front end module includes a power amplifier configured to amplify a transmission signal received at the first terminal and a low-noise amplifier configured to amplify a reception signal received at the second terminal. In some embodiments, the system further includes a first multiplexer coupling the lossy transmission line to the power amplifier and the low-noise amplifier and a second multiplexer coupling the second terminal to the power amplifier and the low-noise amplifier.

In a number of implementations, the present disclosure relates to a radio-frequency (RF) architecture including a packaging substrate configured to receive a plurality of components. The architecture also includes a front end system implemented on the packaging substrate, the front end system including a first terminal configured to communicatively couple to a transceiver through a lossy transmission line, a second terminal configured to communicatively couple to an antenna, a front end module disposed between the first terminal and the second terminal, the front end module configured to amplify an RF signal received at the first terminal or the second terminal.

In accordance with some implementations, the present disclosure relates to a wireless device including a transceiver configured to transmit a transmission radio-frequency (RF) signal or receive an amplified reception RF signal, an antenna configured to transmit an amplified transmission RF signal or receive a reception RF signal, and a front-end module in communication with the antenna, the front end module including a packaging substrate configured to receive a plurality of components, the FEM further including a first terminal communicatively coupled to the transceiver through a lossy transmission line, a second terminal coupled to the antenna, and one or more amplifiers configured to convert the reception RF signal into the amplified reception RF signal or to convert the transmission RF signal into the amplified transmission RF signal.

In some embodiments, the front end module includes a low-noise amplifier configured to convert the reception RF signal into the amplified reception RF signal and a power amplifier configured to convert the transmission RF signal into the amplified transmission RF signal. In some embodiments, the power amplifier and the low-noise amplifier are each differential amplifiers. In some embodiments, the antenna is a differential antenna.

For purposes of summarizing the disclosure, certain aspects, advantages and novel features of some embodiments have been described herein. It is to be understood that not necessarily all such advantages may be achieved in accordance with any particular embodiment. Thus, the embodiments provided herein may be carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed embodiments.

Overview

In some wireless communications configurations, a signal (e.g., a radio-frequency (RF) signal) traverses a lossy path between an antenna and a transceiver. In some implementations, this lossy path also includes a front end module including one or more amplifiers to amplify the signal. In some implementations, the front end module is disposed close to the transceiver, or a system-on-chip (SoC) of which the transceiver is a part. Thus, the bulk of the loss occurs between the antenna and the front end module. As described further below, this can lower the transmitting power of the wireless communications configuration and, therefore, its efficiency. Further, this can introduce loss to received signals, resulting in a higher noise figure and lower sensitivity for the wireless communications configuration.

Disclosed herein are various examples of architectures, circuits, devices and methods that can be configured to, among other things, address the foregoing challenges associated with signal amplification systems in wireless communication systems, devices, and configurations. In some implementations, as described herein, the front end module is disposed close to the antenna and relatively far from the transceiver. This results in a bulk of the loss along the path between the antenna and the transceiver to occur between the front end module and the transceiver rather than between the antenna and the front end module. Furthermore, as described herein, some implementations allow for control and/or supply signals to be delivered to the front end module through the same path that carries the signals between the transceiver and the front end module. As used herein, the signals can refer generally to RF signals that include cellular signals, wireless local area network (WLAN) signals (e.g., WiFi signals), BLUETOOTH® signals, global positioning system (GPS) signals, and the like.

Figure 1:
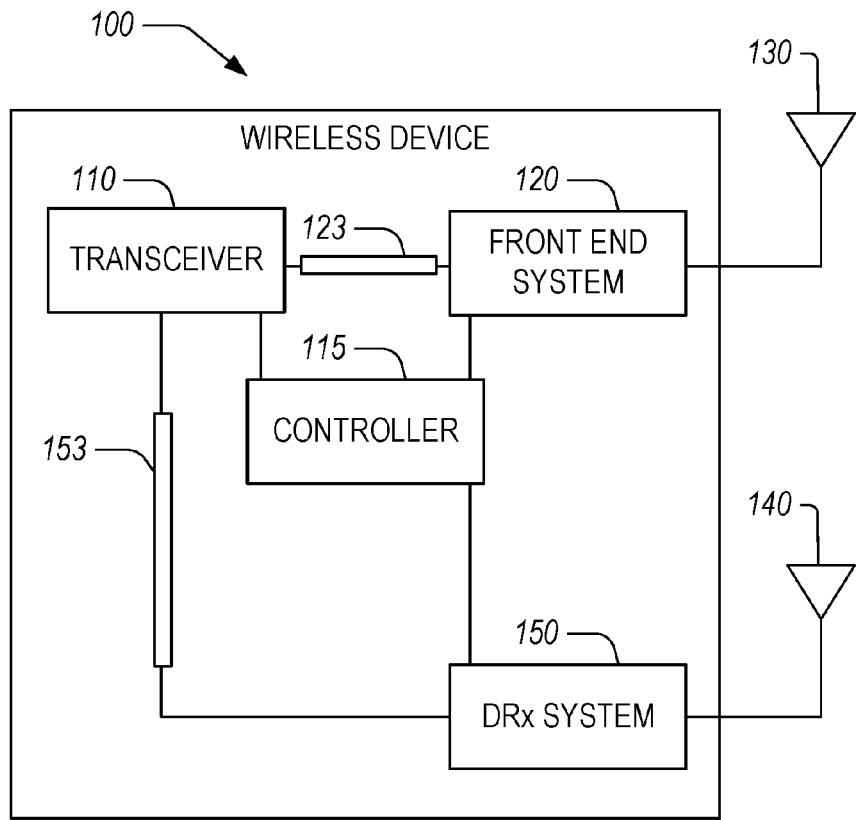
FIG. 1 illustrates an example wireless device with a front end system and a diversity receiver system with lossy transmission lines between the respective systems and a transceiver.

FIG. 1 illustrates an example wireless device 100 with a front end system 120 and a diversity receiver (DRx) system 150 with lossy transmission lines 123, 153 between the respective systems and a transceiver 110. The transceiver 110, front end system 120, and/or DRx system 150 can be controlled by a controller 115. The transceiver 110 is configured to convert between analog signals (e.g., radio-frequency (RF) signals) and digital data signals. To that end, the transceiver 110 may include a digital-to-analog converter, an analog-to-digital converter, a local oscillator for modulating or demodulating a baseband analog signal to or from a carrier frequency, a baseband processor that converts between digital samples and data bits (e.g., voice or other types of data), or other components. The transceiver 110 can be implemented on one or more chips such as a system-onchip (SoC) or one multiple chips that provide certain functionality (e.g., an analog chip, a digital chip, etc.). As used herein, the term transceiver is to be understood to include at least a module, system, or device implemented in a communications configuration using one or more chips, the transceiver configured solely for transmission of signals, solely for reception of signals, or a combination of transmission and reception of signals. The term transceiver can also broadly include the board on which the transceiver is implemented in the wireless communication system, including the supply voltages provided to the transceiver.

The front end system 120 is coupled between a primary antenna 130 and the transceiver 110. The front end system 120 is physically close to the primary antenna 130 to reduce attenuation due to cable loss between the front end system 120 and the primary antenna 130. The front end system 120 may perform processing on an analog signal received from the primary antenna 130 for the transceiver 110 or received from the transceiver 110 for transmission via the primary antenna 130. To that end, the front end system 120 may include filters, power amplifiers (PAs), low-noise amplifiers (LNAs), band select switches, matching circuits, switches, bias circuits, frequency tuning circuits, and other components.

When a signal is transmitted to the wireless device 100, the signal may be received at both the primary antenna 130 and a diversity antenna 140. The primary antenna 130 and diversity antenna 140 may be physically spaced apart such that the signal at the primary antenna 130 and diversity antenna 140 is received with different characteristics. For example, in some embodiments, the primary antenna 130 and the diversity antenna 140 may receive the signal with different attenuation, noise, frequency response, and/or phase shift. The transceiver 110 may use both of the signals with different characteristics to determine data bits corresponding to the signal. In some implementations, the transceiver 110 selects from between the primary antenna 130 and the diversity antenna 140 based on the characteristics, such as selecting the antenna with the highest signal-to-noise ratio. In some implementations, the transceiver 110 combines the signals from the primary antenna 130 and the diversity antenna 140 to increase the signal-to-noise ratio of the combined signal. In some implementations, the transceiver 110 processes the signals to perform multiple-input/multiple-output (MiMo) communication. The transceiver 110 may also process signals from multiple antennas coupled to a single front end system to perform MiMo communication. Accordingly, it is to be understood that the primary antenna 130 and/or the diversity antenna 140 can each be implemented as one or more antennas to provide diversity and/or to allow MiMo communication, among other benefits and advantages.

In the configurations, architectures, circuits, and devices disclosed herein, the front end system 120 and the DRx system 150 are positioned physically close to the respective antennas 130, 140 but physically separated from the transceiver 110. The front end system 120 and DRx system 150 are respectively coupled to the transceiver 110 by transmission lines 123, 153, such as a cable (e.g., a coaxial cable), a printed circuit board (PCB) trace, or the like. As described herein, it is advantageous to place the respective front end systems (e.g., the front end system 120 and/or the DRx system 150) physically close to the respective antennas 130, 140 rather than the transceiver 110. For example, this can increase the efficiency of signal transmission and/or improve the noise figure for received signals relative to systems or devices that position the front end systems physically close the transceiver and/or include lossy transmission lines between the antennas and their respective front end systems. Thus, in some embodiments, the signal loss between the transceiver 110 and the front end system 120 (or the DRx system 150) is greater than the signal loss between the front end system 120 (or the DRx system 150) and the primary antenna 130 (or the diversity antenna 140). For example, the loss between the transceiver 110 and the front end system 120 is greater than about 1 dB and the loss between the front end system 120 and the primary antenna 140 is less than about 1 dB. In some embodiments, the loss between the transceiver 110 and the front end system 120 is between about 2 dB and about 5 dB.

Example Wireless Communications Configurations

Figure 2:
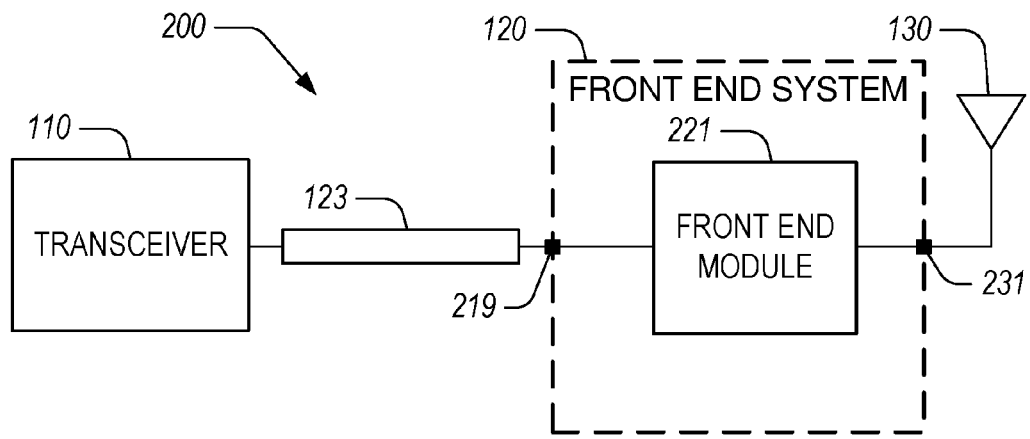
FIG. 2 illustrates an example wireless communications configuration having a lossy transmission line between a transceiver and a terminal of a front end system.

FIG. 2 illustrates an example wireless communications configuration 200 that includes a front end system 120 disposed between a transceiver 110 and an antenna 130. The front end system 120 has a first terminal 219 coupled to the transceiver 110 through a lossy transmission line 123 and a second terminal 231 coupled to the antenna 130. In some implementations, the front end system 120 is configured to receive a transmission signal (e.g., a radio-frequency (RF) signal) from the transceiver 110 via the first terminal 219 and to transmit an amplified version of the transmission signal (referred to as an amplified transmission signal) to the antenna 130 via the second terminal 231. Similarly, in some implementations, the front end system 120 is configured to receive a reception signal from the antenna 130 via the second terminal 231 and to transmit an amplified version of the reception signal (referred to as an amplified reception signal) to the transceiver 110 via the first terminal 219. In some implementations, as described herein, the front end system 120 is configured to amplify just reception signals, just transmission signals, or both reception signals and transmission signals.

The front end system 120 includes a front end module 221 including one or more amplifiers (e.g., power amplifiers (PAs) and/or low-noise amplifiers (LNAs)). The front end module 221 can be configured to perform processing on the signals received from the antenna 130 and/or the transceiver 110. For example, the front end module 221 may be configured to filter the received signals to one or more active frequency bands. As another example, the front end module 221 may be configured to amplify one or more of the filtered signals. As another example, the front end module 221 may be configured to amplify one or more signals received from the transceiver 110 for transmission over the antenna 130. To that end, the front end module 221 may include filters, power amplifiers, low-noise amplifiers, band select switches, multiplexers, antenna switch modules, matching circuits, amplifier bypasses, and other components.

In some implementations, the front end module 221 is configured to amplify a transmission signal. Thus, the first terminal 219 is configured to receive a transmission signal from the transceiver 110, the front end module 221 is configured to amplify the transmission signal, and the second terminal 231 is configured to transmit the amplified transmission signal to the antenna 130. Similarly, in some implementations, the front end module 221 is configured to amplify a reception signal. Thus, the second terminal 231 is configured to receive a reception signal from the antenna 130, the front end module 221 is configured to amplify the reception signal, and the first terminal 219 is configured to transmit the amplified reception signal to the transceiver 110. In some embodiments, as described herein, the front end module 221 is configured to amplify both a transmission signal and a reception signal. Thus, the front end module 221 can include a first amplifier configured to amplify a transmission signal received at the first terminal 219 and a second amplifier configured to amplify a reception signal received at the second terminal 231.

Because the front end system 120, and more particularly the front end module 221, are positioned physically close to the antenna 130 (e.g., the second terminal 231 is physically close to the antenna 130), signals can be degraded as they pass through the lossy transmission line 123 between the front end module 221 and the transceiver 110. The lossy transmission line 123 can be a cable (e.g., a coaxial cable), a conductive trace, or other transmission medium. In some implementations, the lossy transmission line 123 introduces between approximately greater than or equal to about 1 dB of loss, greater than or equal to about 2 decibels (dB) of loss and/or less than or equal to about 5 dB of loss, or greater than or equal to about 3 dB of loss.

By way of contrast, in typical implementations other than those described herein with respect to the figures, a lossy transmission line is disposed between a front end module and an antenna. This can lower the transmitting power of a wireless communications configuration that includes this architecture and, therefore, its efficiency. Similarly, this can attenuate signals received at an antenna prior to amplification in a front end module resulting in a higher noise figure (NF) and lower sensitivity for a wireless communications configuration that includes this architecture. Accordingly, disclosed herein are architectures that position the lossy transmission line 123 between the transceiver 110 and the front end module 221. Relative to the other configurations with the lossy transmission line between the antenna and the front end module, the disclosed wireless communications configuration 200 improves the transmission efficiency of transmitted signals and/or the noise figure of received signals.

The position of the lossy transmission line 123 between the transceiver 110 and the front end module 221 can confer a number of advantages. During transmission, the transmission signal from the transceiver 110 is subject to the loss of the lossy transmission line 123 before being amplified. By way of example, a targeted transmission power at the antenna 130 is X dBm, if the transceiver 110 outputs X dBm of power and the lossy transmission line 123 introduces 3 dB of loss, the input power to the front end module 221 is about 0.5*X dBm. In this configuration, the front end module 221 can add about X/2 dBm of power to result in the targeted X dBm at the antenna 130. In contrast, with a lossy transmission line disposed between the front end module and the antenna, the input power to the front end module is X dBm and the front end module adds X dBm of power to compensate for the 3 dB of loss of the lossy transmission line from the front end module to the antenna. Similarly, during reception, the reception signal from the antenna 130 is amplified before loss due to the lossy transmission line 123, thereby lowering the noise figure and increasing the sensitivity of the wireless communications configuration 100 relative to a configuration with a lossy transmission line disposed between the front end module and the antenna.

Thus, FIG. 2 illustrates a wireless communications configuration 200 including a transceiver 110, a first terminal 219 configured to communicatively couple to the transceiver 110 through a lossy transmission line 123, a second terminal 231 configured to communicatively couple to an antenna 130, and a front end module 221 configured to amplify a signal received at the first terminal 219 or the second terminal 231.

In the wireless communications configuration 200, the loss between the transceiver 110 and the front end module 221 through the lossy transmission line 123 is greater than the loss between the antenna 130 (or the second terminal 231) and the front end module 221. For example, in some implementations, the loss through the lossy transmission line 123 is greater than about 1 dB and the loss between the front end module 221 and the second terminal 231 is less than about 1 dB. In some embodiments, the loss through the lossy transmission line 123 can be greater than or equal to about 1 dB and/or less than or equal to about 6 dB, greater than or equal to about 2 dB and/or less than or equal to about 5 dB, or greater than or equal to about 3 dB.

Figure 3:
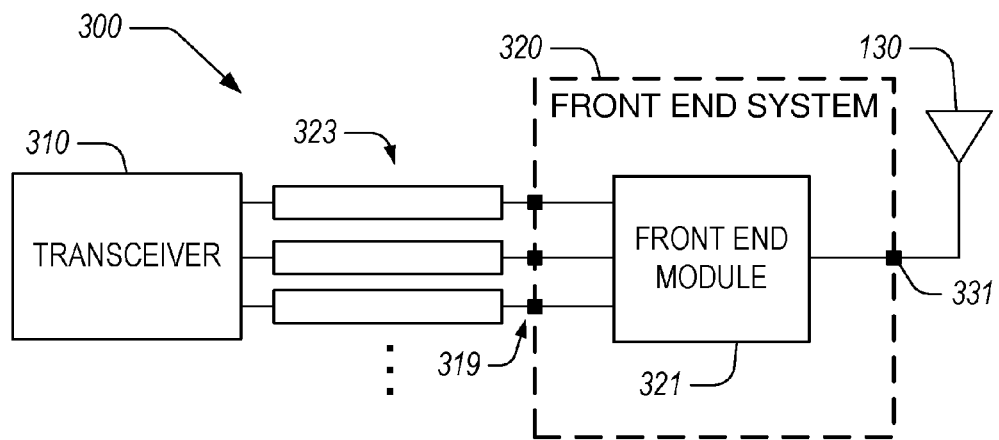
FIG. 3 illustrates an example wireless communications configuration having a plurality of lossy transmission lines between a transceiver and a corresponding plurality of terminals of a front end system.

FIG. 3 illustrates an example wireless communications configuration 300 having a plurality of lossy transmission lines 323 between a transceiver 310 and a corresponding plurality of first terminals 319 of a front end system 320. During transmission, the front end system 320 includes a front end module 321 configured to receive signals from the plurality of first terminals 319, to amplify the received signals, and to transmit the amplified signals to the second terminal 331 for the antenna 130. Similarly, during reception, the front end module 321 is configured to receive signals from the antenna 130 through the second terminal 331, to filter and to direct signals along one or more selected paths (e.g., according to a cellular frequency band, to a wlan path and a cellular path, etc.), and to provide a plurality of amplified reception signals at the plurality of first terminals 319 for transmission over the plurality of lossy transmission lines 323 to the transceiver 310.

Figure 4:
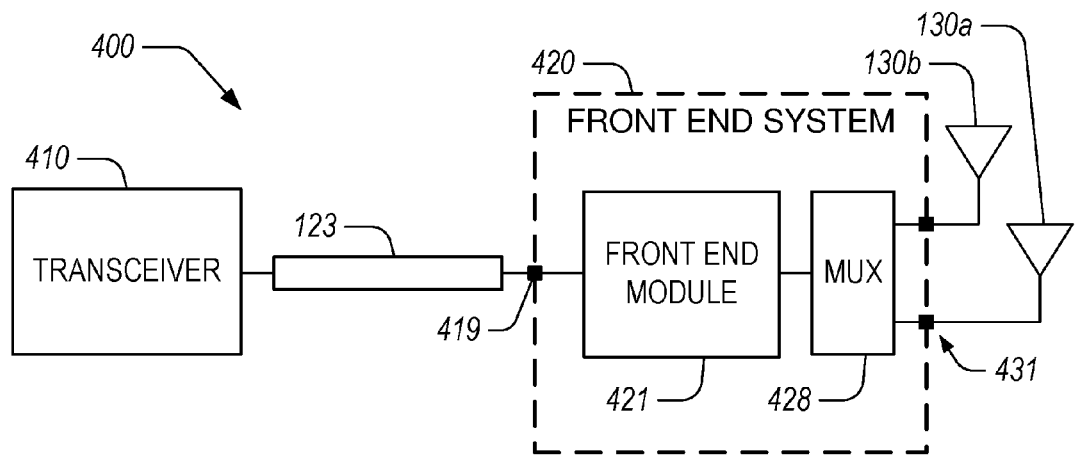
FIG. 4 illustrates an example wireless communications configuration having two antennas coupled to a front end system with a lossy transmission line between the front end system and a transceiver.

FIG. 4 illustrates an example wireless communications configuration 400 having two antennas 130a, 130b coupled to a front end system 420 with a lossy transmission line 123 between the front end system 420 and a transceiver 410. The two antennas 130a, 130b can provide antenna diversity to improve performance of the wireless communications configuration 400. For example, the antennas 130a, 130b can provide spatial diversity, polarization diversity, and the like. The two antennas 130a, 130b can provide MiMo communications capabilities. The front end system 420 includes a multiplexer (MUX) 428 configured to selectively provide a path from a front end module 421 to a respective antenna 130a or 130b. The multiplexer 428 can be a signal splitter/combiner, a single pole double throw (SPDT) switch, a single pole multi-throw (SPMT) switch, a plurality of single pole single throw (SPST) switches, or the like. The multiplexer 428 can provide a plurality of selectable paths from the plurality of second terminals 431 to the front end module 421. The front end module 421 is configured to amplify signals received at a first terminal 419 or at a plurality of second terminals 431.

Although illustrated with two antennas 130a, 130b and two selectable paths through the multiplexer 428, it is to be understood that a plurality of antennas can be used (e.g., 2 or more antennas) with a corresponding plurality of selectable paths through the multiplexer 428. Furthermore, although illustrated as having a single signal line between the front end module 421 and the multiplexer 428, the multiplexer 428 can be configured to communicatively couple to a plurality of signal lines between the front end module 421 and the multiplexer 428. It is to be understood that embodiments disclosed herein can be implemented with a plurality of antennas coupled to a font end system even where illustrated with a single antenna.

Figure 5:
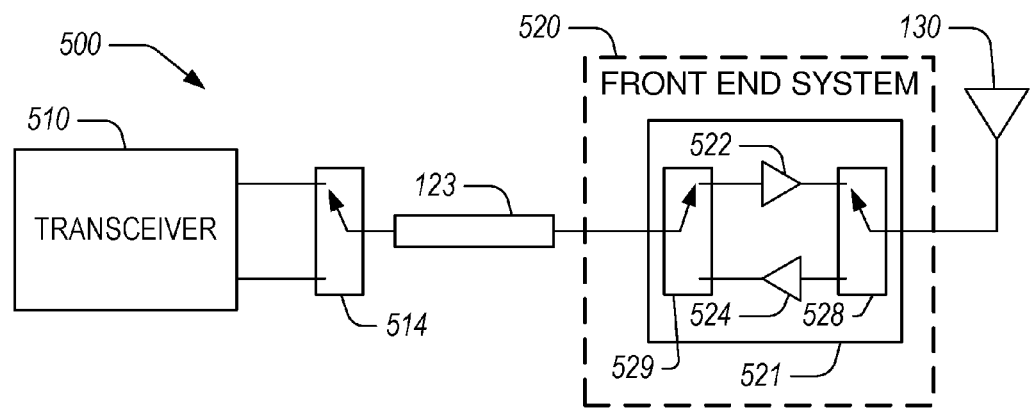
FIG. 5 illustrates an example wireless communications configuration having a front end system with amplifiers for transmit and receive signals and a lossy transmission line between the front end system and a transceiver.

FIG. 5 illustrates an example wireless communications configuration 500 having a front end system 520 with amplifiers for transmit and receive signals and a lossy transmission line 123 between the front end system 520 and a transceiver 510. The transceiver 510 includes a transmit terminal configured to transmit a transmission signal and a receive terminal configured to receive an amplified reception signal.

The front end system 520 includes a front end module 521 having a power amplifier 522 for transmission signals, a low-noise amplifier 524 for reception signals, and two multiplexers 528, 529. As described above, the lossy transmission line 123 disposed between the front end system 520 and the transceiver 510 can confer a number of advantages. A third multiplexer 514 is provided between the lossy transmission line 123 and the transceiver 510.

The power amplifier 522 is configured to amplify a transmission signal and, thereby, convert a transmission signal into an amplified transmission signal. The low-noise amplifier 524 is configured to amplify a reception signal and, thereby, convert a reception signal into an amplified reception signal.

The first multiplexer 528 is configured to route an amplified transmission signal from the power amplifier 522 to the antenna 130 and to route a reception signal from the antenna 130 to the low-noise amplifier 524. In some implementations, the first multiplexer 528 is implemented as a single-pole, double-throw switch. In some implementations, the first multiplexer 524 can be implemented as a diplexer or other configuration.

The second multiplexer 529 is configured to route a transmission signal from the lossy transmission line 123 to the power amplifier 522 and to route an amplified reception signal to the lossy transmission line 123 from the low-noise amplifier 524. In some implementations, the second multiplexer 529 is implemented as a single-pole, double-throw switch. In some implementations, the second multiplexer 529 can be implemented as a diplexer or other configuration.

The third multiplexer 514 is configured to route a transmission signal from the transmit terminal of the transceiver 510 to the lossy transmission line 123 and to route an amplified signal to the receive terminal of the transceiver 510 from the lossy transmission line 123.

Figure 6:
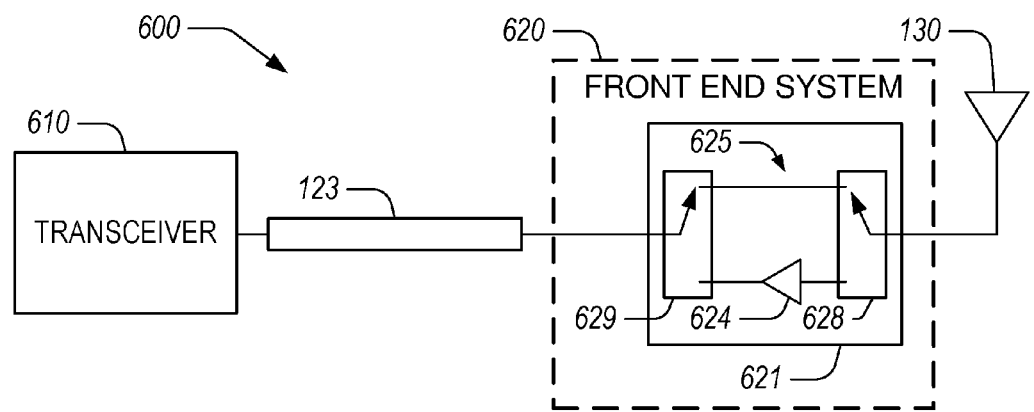
FIG. 6 illustrates an example wireless communications configuration having a front end system providing switchable paths that include an amplification path and a bypass path, the configuration having a lossy transmission line between the front end system and a transceiver.

FIG. 6 illustrates an example wireless communications configuration 600 providing an amplification bypass path 625. The wireless communications configuration 600 includes a front end system 620 that is configured to provide switchable paths within a front end module 621. In an amplification mode, the front end module 621 is configured to direct reception signals from the antenna 130 through an amplifier 624 (e.g., a low-noise amplifier) by controlling a multiplexer 628. In a bypass mode, the front end module 621 is configured to direct reception signals from the antenna 130 through the bypass path 625 by controlling the multiplexer 628. The amplification path and the bypass path 625 are directed to an output path using a multiplexer 629. The output path includes a lossy transmission line 123 between the front end system 620 and a transceiver 610. This allows the front end system 620 to direct signals that may be too large or that have too large an amplitude along the bypass path 625 to reduce the likelihood of damaging the amplifier 624 by directing large signals along the amplification path. It is to be understood that, although only reception signals and paths are illustrated in FIG. 6, the wireless communications configuration can include one or more transmission paths.

Figure 7:
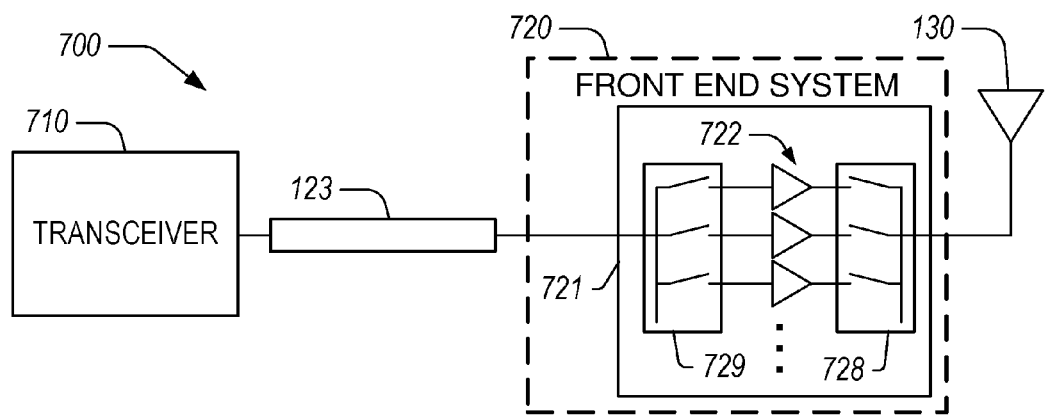
FIG. 7 illustrates an example wireless communications configuration having a front end system that includes a plurality of amplifiers for a corresponding plurality of transmit paths, the configuration having a lossy transmission line between the front end system and a transceiver.

FIG. 7 illustrates an example wireless communications configuration 700 having a front end system 720 configured to amplify transmission signals using a plurality of amplifiers 722 in a front end module 721. The front end module 721 is configured to direct transmission signals received from the transceiver 710 along a plurality of transmit paths to corresponding amplifiers 722. The front end system 720 includes a first multiplexer 729 configured to selectively provide one or more paths from the transceiver 710 to a targeted amplifier(s) 722. The front end system 720 includes a second multiplexer 728 configured to direct signals from the plurality of amplifiers 722 to the antenna 130. The configuration 700 includes a lossy transmission line 123 between the front end system 720 and the transceiver 710, thereby providing the improved efficiencies in signal transmission as described herein. It is to be understood that the front end module 721 can include one or more filters, matching circuits, or the like.

Figure 8:
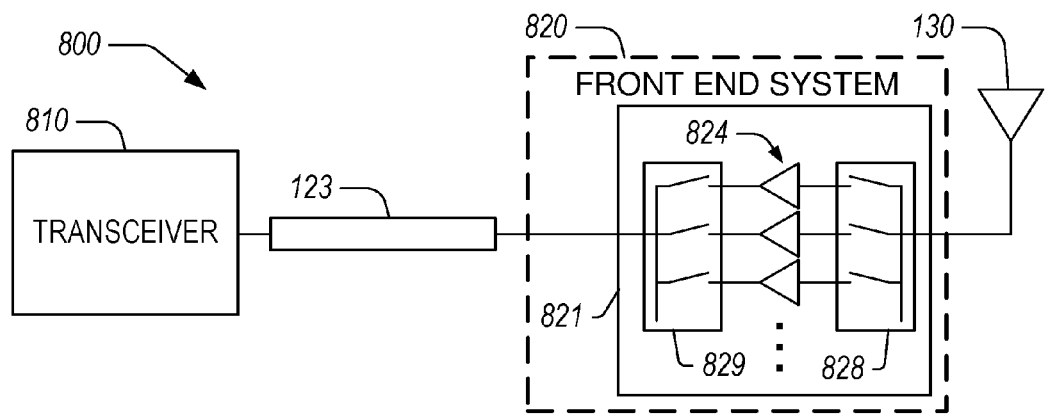
FIG. 8 illustrates an example wireless communications configuration having a front end system that includes a plurality of amplifiers for a corresponding plurality of receive paths, the configuration having a lossy transmission line between the front end system and a transceiver.

FIG. 8 illustrates an example wireless communications configuration 800 having a front end system 820 configured to amplify reception signals using a plurality of amplifiers 824 in a front end module 821. The front end module 821 is configured to direct reception signals received from the antenna 130 along a plurality of reception paths to corresponding amplifiers 824. The front end system 820 includes a first multiplexer 828 configured to selectively provide one or more paths from the antenna 130 to a targeted amplifier(s) 824. The front end system 820 includes a second multiplexer 829 configured to direct signals from the plurality of amplifiers 824 to the transceiver 810. The configuration 800 includes a lossy transmission line 123 between the front end system 820 and the transceiver 810, thereby providing the improved noise figure in signal reception as described herein. It is to be understood that at least one reception path can be a bypass path, as described herein with reference to FIG. 6. Furthermore, it is to be understood that the features of the wireless communications configuration 700 described herein with reference to FIG. 7 and the wireless communications configuration 800 can be combined to provide one or more transmission paths and one or more reception paths. It is to be understood that the front end module 821 can include one or more filters, matching circuits, or the like.

Figure 9:
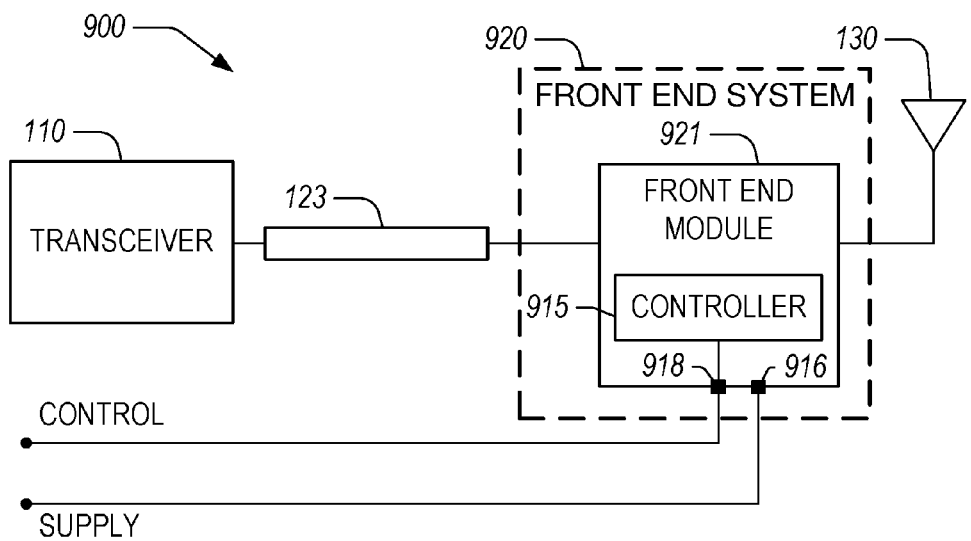
FIG. 9 illustrates an example wireless communications configuration having a front end system with a controller to control the front end system, the front end system controlled by a control signal and powered by a supply signal, the configuration having a lossy transmission line between the front end system and a transceiver.

FIG. 9 illustrates an example wireless communications configuration 900 having a front end system 920 with a controller 915 to control the front end system 920, the front end system 920 controlled by a control signal and powered by a supply signal, the configuration 900 having a lossy transmission line 123 between the front end system 900 and a transceiver 910. The controller 915 can be implemented as part of a front end module 921. The controller 915 can be configured to control operation of the front end module 921, including, for example and without limitation, selection of paths through the front end system, operation of multiplexers, operation of amplifiers, operation of filters, power amplifier biasing, power amplifier frequency tuning, low-noise amplifier frequency tuning, and the like. The controller 915 can receive control signals to control the front end module 921 and/or other elements of the front end system 920. The control signal can be provided by any suitable component of the wireless communications configuration 900. Similarly, the supply signal can be provided by any suitable component of the wireless communications configuration 900. The front end module 921 includes a supply terminal 916 configured to receive the supply signal (e.g., a DC voltage) to power the front end module 921. The front end module 921 includes a control terminal 918 configured to receive the control signal to control the front end module 921.

The controller 915 can be configured to control a state of the front end module 921 based on a received control signal. The controller 915 can control the state of the front end module 921 in a number of ways. In some implementations, the controller 915 is configured to control one or more multiplexers based on the control signal. For example, the controller 915 can place switches of a multiplexer(s) in a first position or a second position. In some implementations, the controller 915 is configured to control the power amplifiers and/or low-noise amplifiers based on the control signal. For example, the controller 915 can enable and/or disable an amplifier (e.g., via a bias line or an enable/disable line of the amplifiers).

Figure 10:
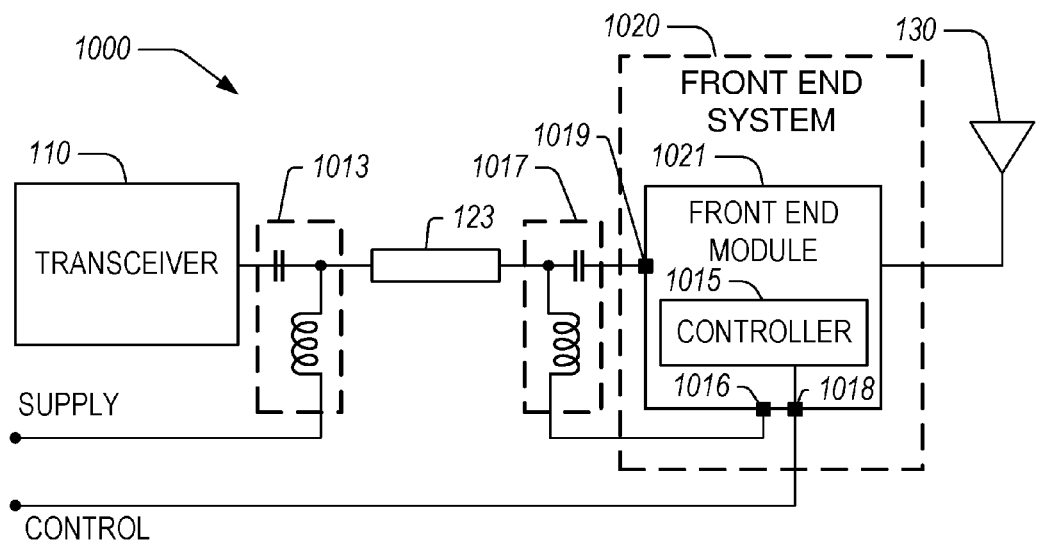
FIG. 10 illustrates an example wireless communications configuration having a front end system with a controller to control the front end system, the front end system controlled by a control signal and powered by a supply signal that is provided through a lossy transmission line between the front end system and a transceiver.

FIG. 10 illustrates an example wireless communications configuration 1000 having a front end system 1020 with a controller 1015 to control the front end system 1020, similar to the configuration 900 described herein with reference to FIG. 9. As with the configuration 900, the controller 1015 is implemented in a front end module 1021. Operation of the front end module 1021 is controlled by a control signal received by the front end module 1021 at a control terminal 1018. The front end module 1021 is powered by a supply signal that is provided through a lossy transmission line 123 between the front end system 1020 and a transceiver 110. The configuration 1000 demonstrates that, in some implementations, the front end module 1021 can be powered over the same line or signal path that carries transmission and/or reception signals.

The front end module 1020 includes a supply terminal 1016 configured to receive the supply signal, a DC voltage, to power the front end module 1021. The configuration 1000 includes a DC coupler 1013 that receives the supply signal and couples the supply signal to the transmission line 123 for transmission to the front end module 1021. The configuration 1000 also includes a DC extractor 1017 configured to extract a DC component of the signal provided on the transmission line 123 to power the front end module 1021. In some embodiments, the DC coupler 1013 includes an LC circuit having a capacitor disposed between the lossy transmission line 123 and the transceiver 110 and an inductor disposed between the lossy transmission line 123 and source of the supply signal. In some embodiments, the DC extractor 1017 includes an LC circuit including a capacitor disposed between the lossy transmission line 123 and a signal terminal 1019 of the front end module 1021 and an inductor disposed between the lossy transmission line 123 and the supply terminal 1016 of the front end module 1021. In some embodiments, the signal loss of the transmission line 123 differs for DC voltages and RF signals (e.g., transmission signals and/or reception signals). For example, the loss of the transmission line 123 for DC voltages can be less than the loss for RF signals.

Figure 11:
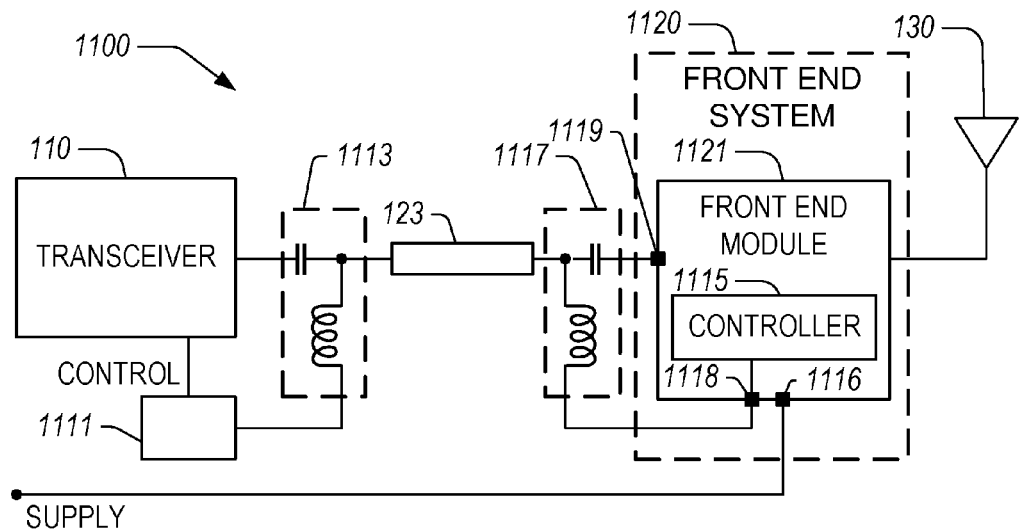
FIG. 11 illustrates an example wireless communications configuration having a front end system with a controller to control the front end system, the front end system powered by a supply signal and controlled by a control signal that is provided through a lossy transmission line between the front end system and a transceiver.

FIG. 11 illustrates an example wireless communications configuration 1100 having a front end system 1120 with a controller 1115 to control the front end system 1120, similar to the configuration 900 described herein with reference to FIG. 9. As with the configuration 900, the controller 1115 is implemented in a front end module 1121. The front end module 1121 is powered by a supply signal received at a supply terminal 1116. Operation of the front end module 1121 is controlled by a control signal that is provided through a lossy transmission line 123 between the front end system 1120 and a transceiver 110. The configuration 1100 demonstrates that, in some implementations, the front end module 1121 can be controlled over the same line that carries the transmission and/or reception signals.

The front end module 1120 includes a control terminal 1118 configured to receive the control signal, a DC voltage, to control the front end module 1121. The configuration 1100 includes a DC coupler 1113 that receives the control signal and couples the control signal to the transmission line 123 for transmission to the front end module 1121. The configuration 1100 also includes a DC extractor 1117 configured to extract a DC component of the control signal provided on the transmission line 123 to control the front end module 1121. In some embodiments, the DC coupler 1113 includes an LC circuit having a capacitor disposed between the lossy transmission line 123 and the transceiver 110 and an inductor disposed between the lossy transmission line 123 and a control signal switch 1111. In some embodiments, the DC extractor 1117 includes an LC circuit including a capacitor disposed between the lossy transmission line 123 and a signal terminal 1119 of the front end module 1121 and an inductor disposed between the lossy transmission line 123 and the control terminal 1118 of the front end module 1121. In some embodiments, the signal loss of the transmission line 123 differs for DC voltages and RF signals (e.g., transmission signals and/or reception signals). For example, the signal loss of the transmission line 123 for DC voltages can be less than the loss for RF signals.

The control signal switch 1111 is configured to receive one or more voltage signals from the transceiver 110 (and/or a board that includes the transceiver 110) and to select a control signal for transmission to the lossy transmission line 123 through the DC coupler 1113. The control signal(s) provided by the transceiver 110 can be supplied by DC voltage sources used to control and/or power the transceiver 110.

Figure 12:
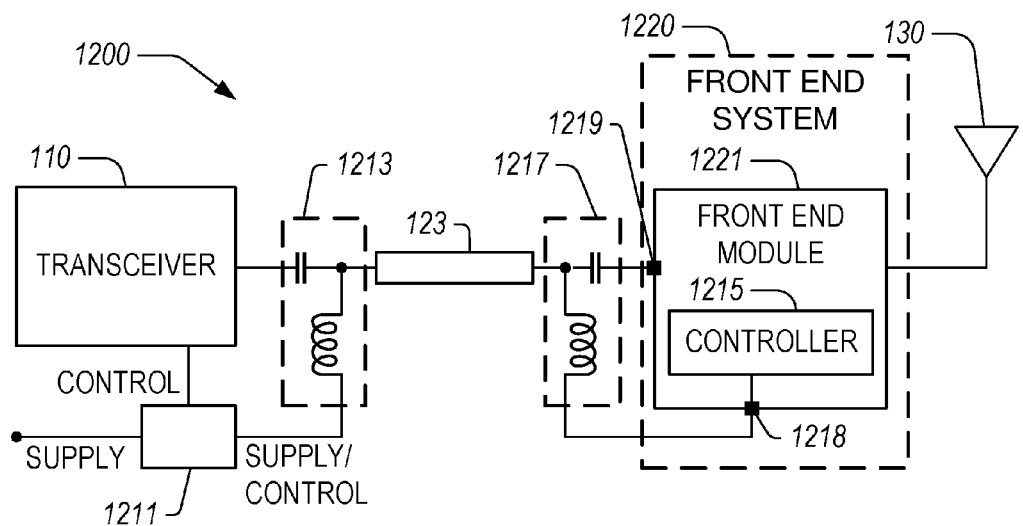
FIG. 12 illustrates an example wireless communications configuration having a front end system with a controller to control the front end system, the front end system powered by a supply signal and controlled by a control signal each of which is provided through a lossy transmission line between the front end system and a transceiver.

FIG. 12 illustrates an example wireless communications configuration 1200 having a front end system 1220 with a controller 1215 to control the front end system 1220, similar to the configuration 900 described herein with reference to FIG. 9. As with the configuration 900, the controller 1215 is implemented in a front end module 1221. The front end module 1221 is powered by a supply signal and controlled by a control signal, each of which is provided through a lossy transmission line 123 between the front end system 1220 and a transceiver 110. The configuration 1200 demonstrates that, in some implementations, the front end module 1221 can be powered and controlled over the same line that carries the transmission and/or reception signals.

The front end module 1220 includes a supply and control terminal 1218 configured to receive the supply and control signal, a DC voltage, that can be used to power and to control the front end module 1221. The configuration 1200 includes a DC coupler 1213 that receives the supply and control signal and couples it to the transmission line 123 for transmission to the front end module 1221. The configuration 1200 also includes a DC extractor 1217 configured to extract a DC component of the signals (e.g., the supply and control signal) provided on the transmission line 123 to power and to control the front end module 1221. In some embodiments, the DC coupler 1213 includes an LC circuit having a capacitor disposed between the lossy transmission line 123 and the transceiver 1210 and an inductor disposed between the lossy transmission line 123 and a control signal combiner 1211. In some embodiments, the DC extractor 1217 includes an LC circuit including a capacitor disposed between the lossy transmission line 123 and a signal terminal 1219 of the front end module 1221 and an inductor disposed between the lossy transmission line 123 and the supply and control terminal 1218 of the front end module 1221.

The control signal combiner 1211 is configured to receive one or more voltage signals from the transceiver 110 (and/or a board that includes the transceiver 110) and to select a control signal to combine with a supply voltage. The control signal(s) provided by the transceiver 110 can be supplied by DC voltage sources used to control and/or power the transceiver 110. The control signal combiner 1211 is also configured to receive a supply voltage from a supply voltage source and to combine that voltage with the control signal to generate a supply/control signal for transmission to the lossy transmission line 123 through the DC coupler 1213.

In this way, the control signal can be the supply voltage that powers the front end module 1221. For example, the controller 1215 can place the front end module 1221 in a first state (e.g., a signal transmission mode) when the supply/control voltage is a first value (e.g., 5 volts), place the front end module 1221 in a second state (e.g., a signal reception mode) when the supply/control voltage is a second value (e.g., 3.3 V), and place the front end module 1221 in a third state (e.g., a bypass mode) when the supply/control voltage is a third value (e.g., 1.8 V). Using the value of the supply/control voltage as the control signal may advantageously reduce the amount of signal routing as a separate control signal need not be routed from the transceiver 110 (or the system of which the transceiver 110 is a part) to the front end module 1221.

In one or more of the embodiments described herein, the amplifiers of the front end module are differential amplifiers. When a transmission and/or reception signal is leaked into the supply terminal of the front end module it can create mixing products. However, if the amplifiers are differential, the leaked signal may be rejected as a common mode signal. Further, the antenna can be a differential antenna. If the antenna 130 is a differential antenna, a differential to single-ended conversion need not be performed, thereby improving efficiency.

Example Modules and Devices

Figure 13:
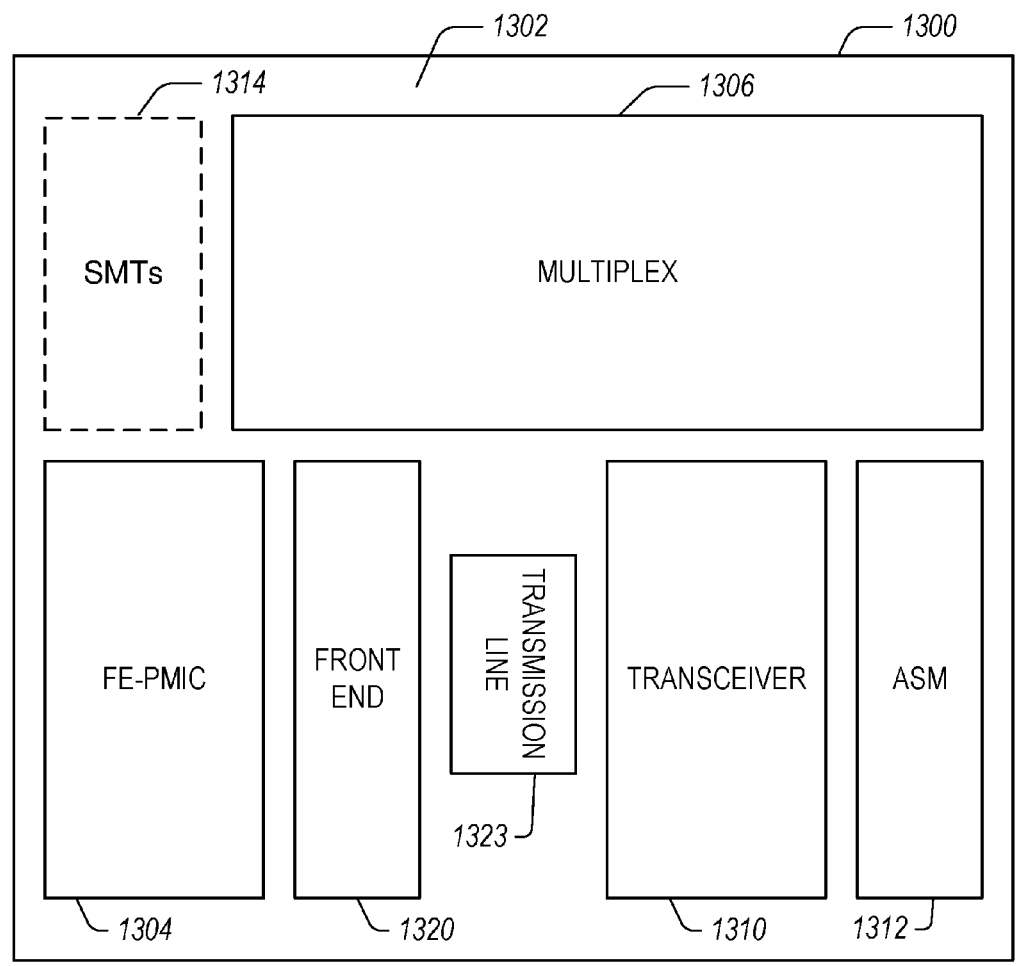
FIG. 13 illustrates an architecture that at least partially incorporates at least some elements of the wireless communications configurations of FIGS. 1-12.

FIG. 13 illustrates that, in some embodiments, some or all of wireless communications configurations (e.g., those shown in FIGS. 1-12) can be implemented, wholly or partially, in an architecture. Such an architecture can include, for example, a front-end module (FEM). In the example of FIG. 13, an architecture 1300 can include a packaging substrate 1302, and a number of components can be mounted on such a packaging substrate 1302. For example, an FE-PMIC component 1304, a front end system 1320, a transceiver 1310, a transmission line 1323 coupling the front end system 1320 to the transceiver 1310, and a multiplexer assembly 1306 can be mounted and/or implemented on and/or within the packaging substrate 702. Other components such as a number of SMT devices 1314 and an antenna switch module (ASM) 1312 can also be mounted on the packaging substrate 1302. Although all of the various components are depicted as being laid out on the packaging substrate 1302, it will be understood that some component(s) can be implemented over other component(s).

In some implementations, a device and/or a circuit having one or more features described herein can be included in an RF electronic device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 14:
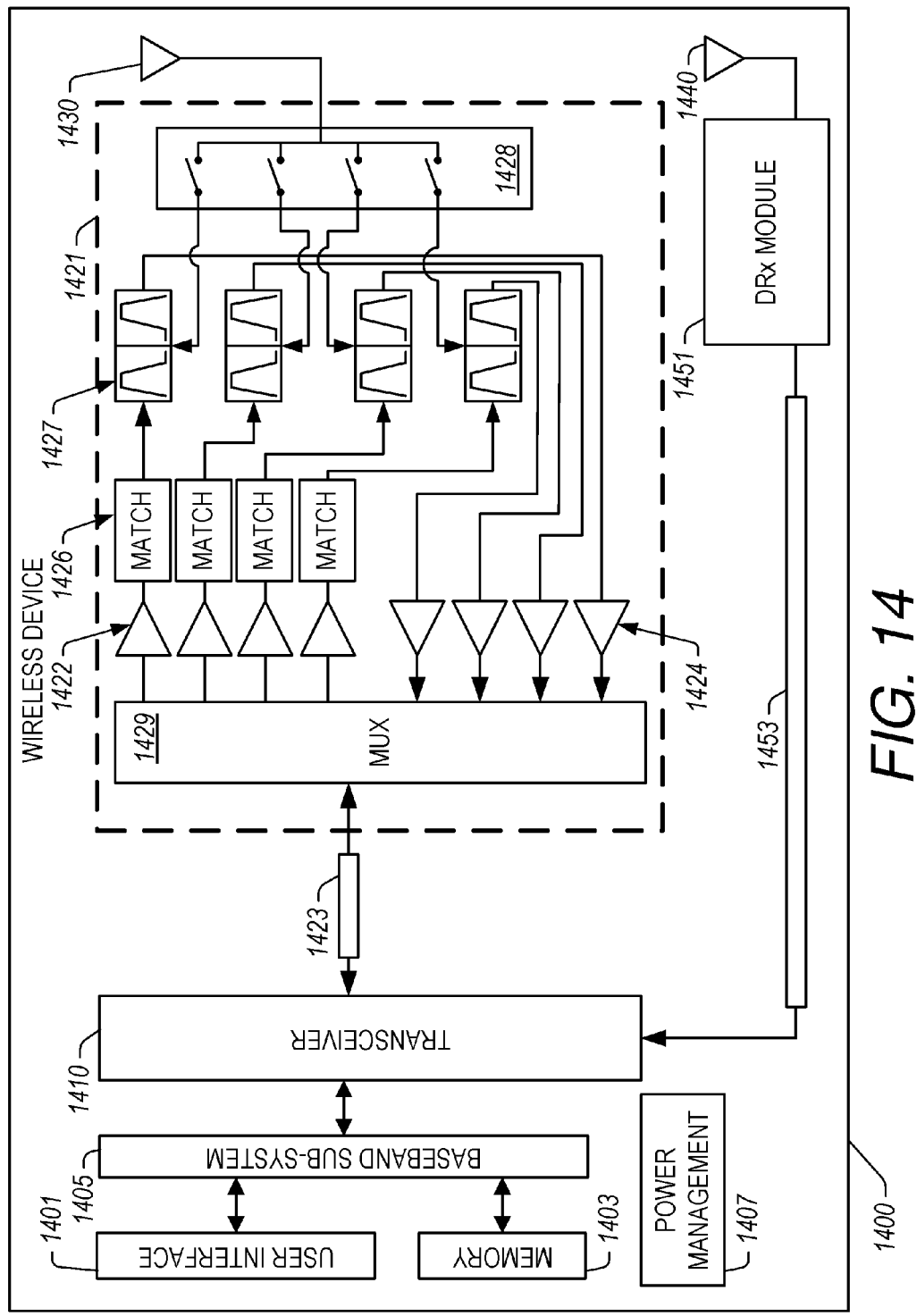
FIG. 14 illustrates a wireless device having one or more advantageous features described herein.

FIG. 14 depicts an example wireless device 1400 having one or more advantageous features described herein. In the context of one or more modules having one or more features as described herein, such modules can be generally depicted by a dashed box 1421 (which can be implemented, for example, as a front-end module within a front end system) and a diversity receiver (DRx) module 1451 (which can be implemented within a diversity receiver system).

Power amplifiers (PAs) 1422 can receive their respective signals (e.g., radio-frequency (RF) signals) from a transceiver 1410 after transmission through a lossy transmission line 1423. Similarly, low-noise amplifiers (LNAs) 1424 can be configured to amplify received signals for delivery to the transceiver 1410 through the lossy transmission line 1423. The transceiver 1410 can be configured and operated to generate signals to be amplified and transmitted, and to process received signals. The transceiver 1410 is shown to interact with a baseband sub-system 1405 that is configured to provide conversion between data and/or voice signals suitable for a user and RF signals suitable for the transceiver 1410. The transceiver 1410 can also be in communication with a power management component 1407 that is configured to manage power for the operation of the wireless device 1400. Such power management can also control operations of the baseband sub-system 1405 and the modules 1421, 1451.

The baseband sub-system 1405 is shown to be connected to a user interface 1401 to facilitate various input and output of voice and/or data provided to and received from the user. The baseband sub-system 1405 can also be connected to a memory 1403 that is configured to store data and/or instructions to facilitate the operation of the wireless device, and/or to provide storage of information for the user.

In the example wireless device 1400, outputs of the PAs 1422 are shown to be matched (via respective match circuits 1426) and routed to a filter bank 1427 that includes respective diplexers. Such amplified and filtered signals can be routed to a primary antenna 1430 through a switching network 1428 for transmission. In some embodiments, the filters 1427 can allow transmit and receive operations to be performed simultaneously using a common antenna (e.g., the primary antenna 1430). Received signals can be routed to receive paths that can include the low-noise amplifiers (LNAs) 1424. In some implementations, the receive paths also include one or more filters (not shown). The front end module 1421 can include a multiplexer 1429 configured to direct signals from the lossy transmission line 1423 to the PAs 1422 and/or to direct signals from the LNAs 1424 to the lossy transmission line 1423.

The wireless device also includes a diversity antenna 1440 and a diversity receiver module 1451 that receives signals from the diversity antenna 1440. The diversity receiver module 1451 transmits received signals to the transceiver 1410 through a lossy transmission line 1453. In some embodiments, a diplexer or triplexer can be included between the diversity antenna 1440 and the diversity receiver module 1451 and/or between the primary antenna 1430 and the front end module 1421.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A wireless communications system comprising:
   a transceiver;
   a lossy transmission line communicatively coupled to the transceiver;
   a first terminal communicatively coupled to the transceiver through the lossy transmission line;
   a second terminal communicatively coupled to an antenna;
   a front end module disposed between the first terminal and the second terminal, the front end module configured to amplify a signal received at the first terminal or the second terminal, the front end module having a supply terminal configured to receive a supply voltage; and
   a control signal combiner configured to receive the supply voltage, to receive a signal from the transceiver, to select a control signal based on the received signal from the transceiver, and to combine the selected control signal with the supply voltage to generate a supply/control voltage for transmission to the front end module through the lossy transmission line that is communicatively coupled to the supply terminal.

2. The system of claim 1 wherein signal loss between the transceiver and the front end module is greater than signal loss between the front end module and the second terminal.

3. The system of claim 2 wherein the signal loss over the lossy transmission line between the transceiver and the front end module is greater than 1 dB and the signal loss between the front end module and the second terminal is less than 1 dB.

4. The system of claim 3 wherein the signal loss over the lossy transmission line between the transceiver and the front end module is greater than or equal to 2 dB and less than or equal to 5 dB.

5. The system of claim 1 further comprising a DC coupler configured to couple a DC voltage to the lossy transmission line and a DC extractor configured to extract a DC voltage from the lossy transmission line, the DC extractor coupled to the supply terminal.

6. The system of claim 1 further comprising a controller configured to control a state of the front end module based on of the supply/control voltage.

7. The system of claim 5 wherein the DC coupler includes an LC circuit having a capacitor disposed between the lossy transmission line and the transceiver and an inductor disposed between the lossy transmission line and a source of the supply voltage.

8. The system of claim 1, wherein the first terminal is configured to receive a transmission signal from the transceiver, the front end module is configured to amplify the transmission signal, and the second terminal is configured to transmit the amplified transmission signal to the antenna.

9. The system of claim 1 wherein the second terminal is configured to receive a reception signal from the antenna, the front end module is configured to amplify the reception signal, and the first terminal is configured to transmit the amplified reception signal to the transceiver.

10. The system of claim 1 wherein the front end module includes a power amplifier configured to amplify a transmission signal received at the first terminal and a low-noise amplifier configured to amplify a reception signal received at the second terminal.

11. The power amplification system of claim 10 further comprising a first multiplexer coupling the lossy transmission line to the power amplifier and the low-noise amplifier and a second multiplexer coupling the second terminal to the power amplifier and the low-noise amplifier.

12. A radio-frequency (RF) architecture comprising:
    a packaging substrate configured to receive a plurality of components;
    a front end system implemented on the packaging substrate, the front end system including a first terminal configured to communicatively couple to a transceiver through a lossy transmission line, a second terminal configured to communicatively couple to an antenna, a front end module disposed between the first terminal and the second terminal, the front end module configured to amplify an RF signal received at the first terminal or the second terminal, the front end module having a supply terminal configured to receive a supply voltage; and
    a control signal combiner configured to receive the supply voltage, to receive a signal from the transceiver, to select a control signal based on the received signal from the transceiver, and to combine the selected control signal with the supply voltage to generate a supply/control voltage for transmission to the front end module through the lossy transmission line that is communicatively coupled to the supply terminal.

13. A wireless device comprising:
a transceiver configured to transmit a transmission radio-frequency (RF) signal or receive an amplified reception RF signal;
an antenna configured to transmit an amplified transmission RF signal or receive a reception RF signal; and
a front-end module in communication with the antenna, the front end module including a packaging substrate configured to receive a plurality of components, the FEM further including a first terminal communicatively coupled to the transceiver through a lossy transmission line, a second terminal coupled to the antenna, one or more amplifiers configured to convert the reception RF signal into the amplified reception RF signal or to convert the transmission RF signal into the amplified transmission RF signal, and a supply terminal configured to receive a supply voltage; and
a control signal combiner configured to receive the supply voltage, to receive a signal from the transceiver, to select a control signal based on the received signal from the transceiver, and to combine the selected control signal with the supply voltage to generate a supply/control voltage for transmission to the front end module through the lossy transmission line that is communicatively coupled to the supply terminal.

14. The wireless device of claim 13 wherein the front end module includes a low-noise amplifier configured to convert the reception RF signal into the amplified reception RF signal and a power amplifier configured to convert the transmission RF signal into the amplified transmission RF signal.

15. The wireless device of claim 14 wherein the power amplifier and the low-noise amplifier are each differential amplifiers.

16. The wireless device of claim 15 wherein the antenna is a differential antenna.

* * * * *